United States Patent [19]
Katy et al.

[11] Patent Number: 5,092,735
[45] Date of Patent: Mar. 3, 1992

[54] BLADE OUTER AIR SEAL COOLING SYSTEM

[75] Inventors: Jerome H. Katy, Palm Beach Gardens; Perry P. Sifford, Jupitor, both of Fla.

[73] Assignee: The United States of America as represented by the Secretary of the Air Force, Washington, D.C.

[21] Appl. No.: 547,256

[22] Filed: Jul. 2, 1990

[51] Int. Cl.[5] .............................................. F01D 5/18
[52] U.S. Cl. ...................................... 415/115; 415/116
[58] Field of Search ................ 415/114, 115, 116, 117

[56] References Cited

U.S. PATENT DOCUMENTS

| | | | |
|---|---|---|---|
| 3,529,903 | 9/1970 | Scalzo et al. | 415/115 |
| 3,583,824 | 6/1971 | Smuland | 415/117 |
| 3,689,174 | 9/1972 | Rahaim et al. | 415/115 |
| 3,836,279 | 9/1974 | Lee | 415/115 |
| 4,053,254 | 10/1977 | Chaplin et al. | 415/116 |
| 4,355,952 | 10/1982 | Brown et al. | 415/115 |
| 4,642,024 | 2/1987 | Weidner | 415/116 |
| 4,650,395 | 3/1987 | Weidner | 415/116 |

Primary Examiner—John T. Kwon
Attorney, Agent, or Firm—Fredric L. Sinder; Donald J. Singer

[57] ABSTRACT

An improved blade outer air cooling system for aircraft jet engines is disclosed. An integrated substrate backplate, cooling impingement plate and manifold replaces a conventional substrate backplate supporting a seal surface. A cooling impingement plate is mounted on the back of the backplate and a manifold is mounted over the impingement plate. The combined seal surface and new substrate outer air seal assembly attaches to the engine case structure through flange hooks formed as part of the manifold. A support supports the manifold inside the case structure and includes an opening for cooling air to enter an inlet into the manifold. A metal seal ring is compressed between the manifold and the support. The backplate includes holes for exhausting or purging cooling air after impinging on the backplate. The backplate, impingement plate and manifold may be welded, brazed or otherwise united together.

15 Claims, 2 Drawing Sheets

BLADE OUTER AIR SEAL COOLING SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to outer air seals for gas turbine engines, such as aircraft jet engines, and more specifically to an improved structure for supplying cooling air to the back of outer air seals.

Outer air seals closely surround the outside of an imaginary hoop traced by the moving tips of spinning rotor blades in gas turbine engines. They block, as much as possible, any flow of turbine combustion gases over the blade tips to confine the flow of combustion gas to an intended annular flowpath past the blade lengths.

The seals are divided into many arcuate segments to allow for differential thermal expansion between the seals and their supporting structures, which supporting structures are in turn attached to the engine case structure. Because the seals are in contact with the hot, pressurized combustion gases, they must be cooled to keep their temperature within acceptable limits and to provide an adequate service life.

The prior art includes a number of minor variations on a conventional structure for cooling outer air seals. As disclosed in U.S. Pat. No. 4,642,024 to Weidner, conventional outer air seals include the seal surface, which faces the blade tips and is generally a ceramic, attached to a substrate which generally comprises a backplate having on its back flange hooks which engage a boxlike support structure that is in turn attached to the engine case structure. Cooling air is flowed into the cavity formed by the engine case structure, the sides of the support structure and the backplate. A perforated cooling impingement plate is mounted in a spaced relationship over the backplate to redirect cooling air into jets which perpendicularly impact the backplate to increase cooling over that which would result if the cooling air merely passed over the backplate.

The interlocking arrangement of the various rigid outer air seal components, particularly where the outer air seal attaches to the engine case structure, creates a large number of unwanted leak paths for the cooling air. The prior art has in some cases addressed this problem by directing the unavoidably leaking air to other structural components where cooling may be of value. This has not, of course, provided a complete solution. Thus it is seen that there is a need for an improved outer air seal that avoids the leaks inherent in the prior art.

It is, therefore, a principal object of the present invention to provide an outer air seal assembly that has a leakproof connection for cooling air between the seal assembly and the engine case structure.

It is a feature of the present invention that it includes a manifold that more directly flows cooling air toward the holes in the impingement plate than the more generalized flow in the prior art.

It is an advantage of the present invention that it provides much more precise control over the cooling air after impinging on the backplate.

It is another advantage of the present invention that its implementation is straightforward and uncomplicated.

These and other objects, features and advantages of the present invention will become apparent as the description of certain representative embodiments proceeds.

SUMMARY OF THE INVENTION

The present invention provides a novel structure for flowing cooling air to the back of a blade outer air seal. The unique discovery of the present invention is that adding structural elements to a conventional coolable outer air seal assembly to form an integral manifold structure over the impingement plate provides an improved flowpath for cooling air without the air leaks and other disadvantages of the prior art. The invention replaces the prior art backplate substrate with a integral substrate that includes a backplate, impingement plate and manifold. The flange hooks for mounting the outer air seal are now part of the manifold.

Accordingly, the present invention is directed to a substrate for an outer air seal for mounting inside a turbine case structure, comprising an integrated assembly of a backplate, an impingement plate mounted in a spaced relationship, over most of its surface area, over the backplate, and a manifold, mounted over the impingement plate, having a single inlet, and means for sealing the manifold single inlet to the turbine case structure. The means for sealing may comprise a compressible seal and the compressible seal may be a metal "C" section seal. The manifold may be brazed or welded to the impingement plate and the impingement plate may be brazed or welded to the backplate. Flange hooks may be formed as part of the manifold. Exhaust means may be provided from a chamber defined between the backplate and the impingement plate. The exhaust means may include a plurality of purge holes along an edge of the backplate in contact with the impingement plate.

The invention is also directed to an outer air seal assembly comprising a seal surface and a substrate as described.

DESCRIPTION OF THE DRAWINGS

The present invention will be more clearly understood from a reading of the following detailed description in conjunction with the accompanying drawings wherein.

DETAILED DESCRIPTION

Figure 1:
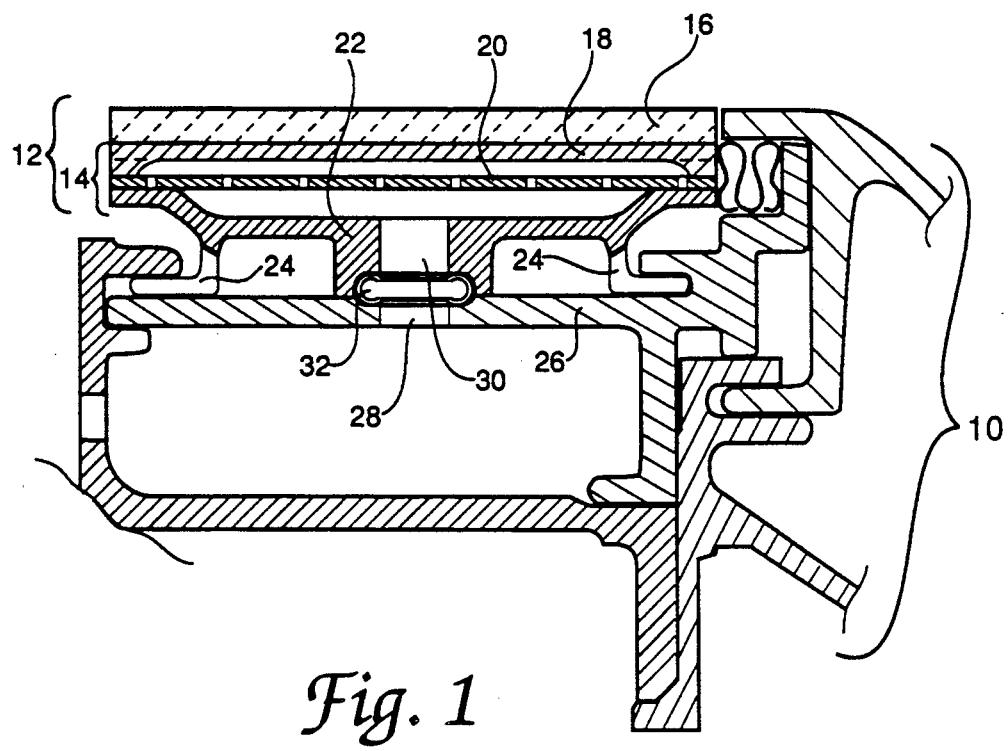
FIG. 1 is a cross-sectional view of a segment of the case structure of the turbine section of a gas turbine engine showing an outer air seal assembly incorporating a substrate for a seal surface according to the teachings of the present invention.

Referring now to FIG. 1 of the drawings, there is shown a cross-sectional view of a segment of an engine case structure 10 of the turbine section of a gas turbine engine showing an outer air seal assembly 12 incorporating a substrate 14 for a seal surface 16 according to the teachings of the present invention. Seal surface 16 is supported by underlying substrate 14 which comprises a backplate 18, a cooling impingement plate 20 mounted on the back of backplate 18 and a manifold 22 mounted over impingement plate 20. Outer air seal assembly 12 attaches to case structure 10 through flange hooks 24 formed as part of manifold 22. A support 26 supports manifold 22 inside case structure 10 and includes an opening 28 for cooling air to enter an inlet 30 into manifold 22. A "C" section metal seal ring 32 is compressed between manifold 22 and support 26 to seal inlet 30 to support 26 and minimize leaking of cooling air.

Figure 2:
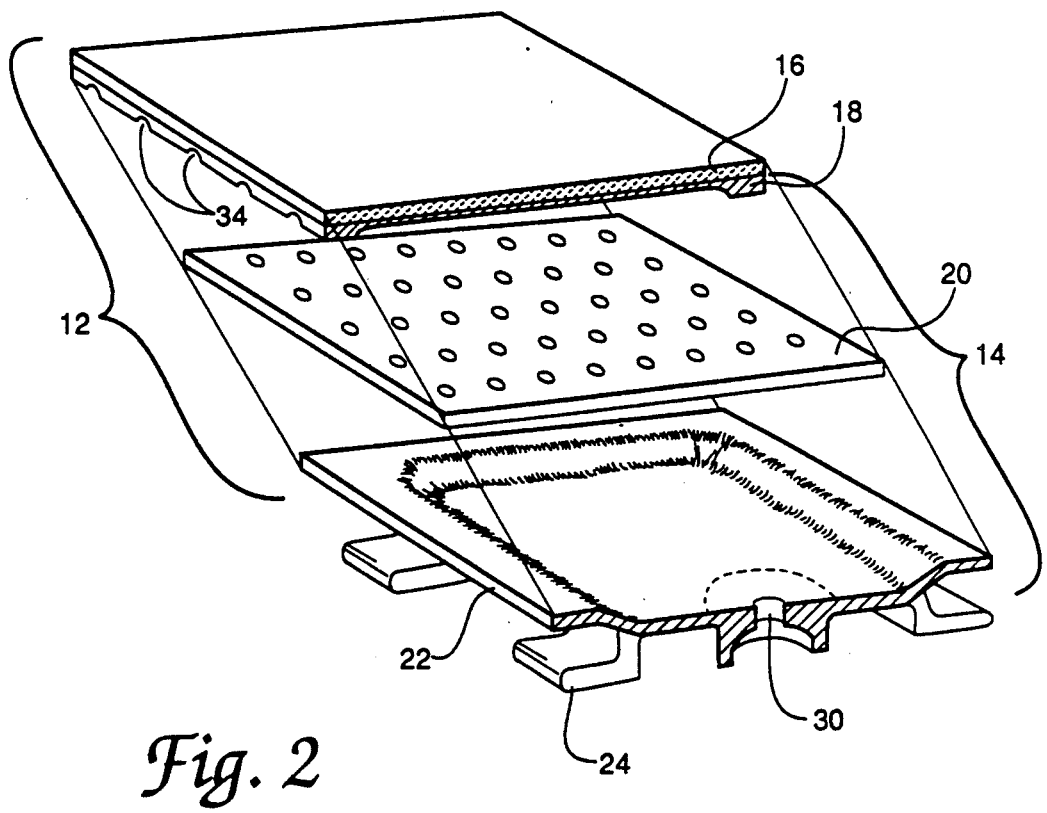
FIG. 2 is an exploded perspective view of the seal surface and the integrated backplate, impingement plate and manifold substrate structure according to the teachings of the present invention; and, FIG. 3 is a perspective view of the outer seal assembly of FIG. 1 showing the relationship of the outer seal assembly to the spinning blades and other engine case structure components.

FIG. 2 is an exploded perspective view of seal surface 16 and its integrated substrate 14 comprising backplate 18, impingement plate 20 and manifold 22. Backplate 18 includes holes 34 for exhausting or purging cooling air after impinging on backplate 18. Backplate 18, impingement plate 20 and manifold 22 may be welded, brazed or otherwise united together.

Figure 3:
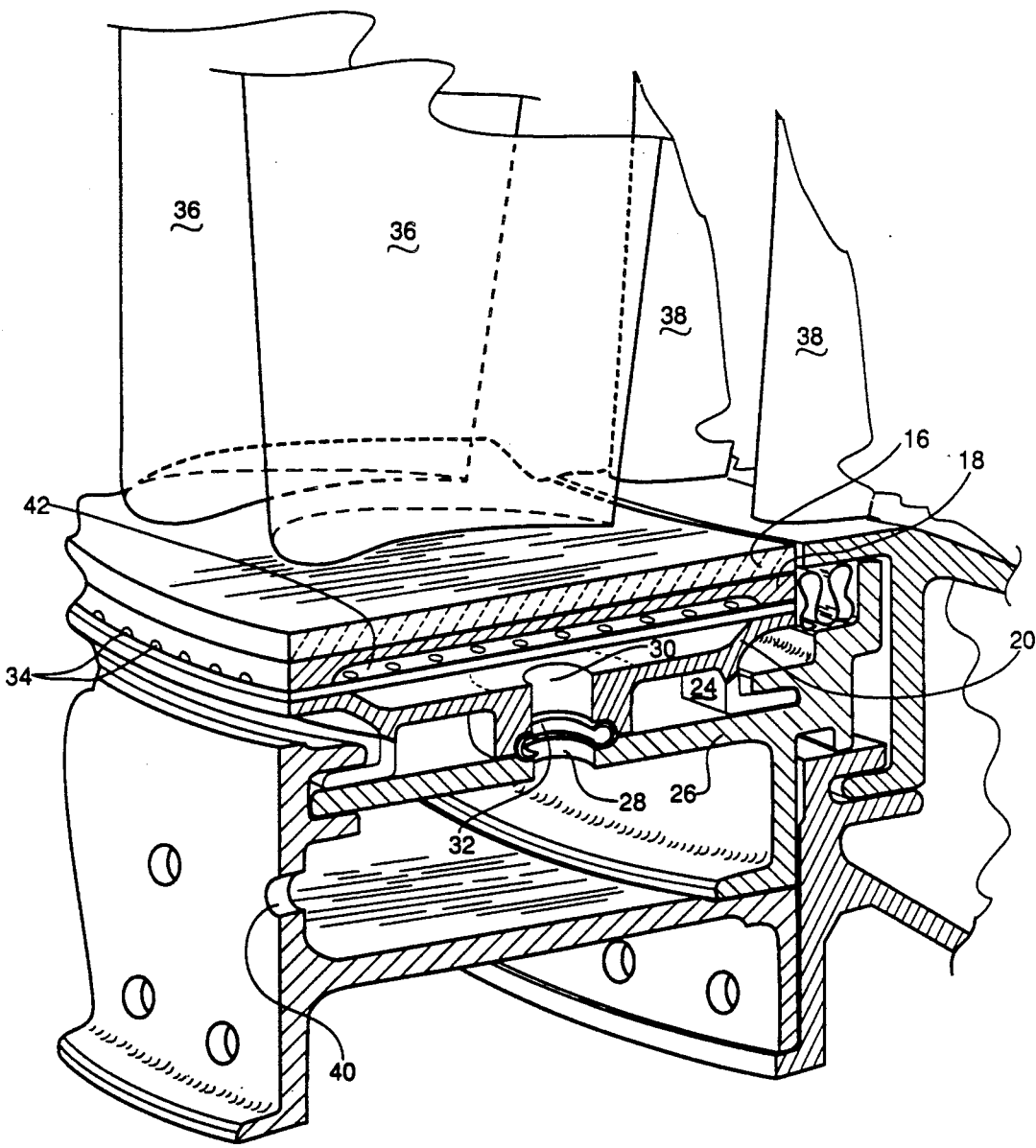

FIG. 3 is a perspective view of outer seal assembly 12 showing its relationship to the spinning blades 36, stator vanes 38 and other gas turbine engine components. Cooling air enters case structure 10 through an opening 40.

Those with skill in the art of the invention will see that integrated substrate 14 removes most of the possible cooling air leak paths present in prior art structures.

The disclosed blade outer air seal assembly successfully demonstrates incorporating improvements for outer air seals in gas turbine engines into a single integrated replacement substrate. Although the disclosed invention is specialized, its teachings will find application in other areas where improvements are desired to be made to existing machines without requiring major structural changes to the overall apparatus.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A substrate for an outer air seal for mounting inside a turbine case structure, comprising an integrated assembly of:
    (a) a backplate;
    (b) an impingement plate mounted in a spaced relationship, over most of its surface area, over the backplate; and,
    (c) a manifold, mounted over the impingement plate, having a single inlet; and,
    (d) means for preventing leakage between the manifold single inlet and the turbine case structure.

2. The substrate according to claim 1, wherein the means for preventing leakage comprise a compressible seal.

3. The substrate according to claim 2, wherein the compressible seal is a metal "C" section seal.

4. The substrate according to claim 1, wherein the manifold is brazed or welded to the impingement plate.

5. The substrate according to claim 4, wherein the impingement plate is brazed or welded to the backplate.

6. The substrate according to claim 1, further comprising flange hooks formed as part of the manifold.

7. The substrate according to claim 1, a chamber being defined between the backplate and the impingement plate, further comprising exhaust means from the chamber.

8. The substrate according to claim 7, wherein the exhaust means include a plurality of purge holes along an edge of the backplate in contact with the impingement plate.

9. An outer air seal assembly for mounting inside a turbine case structure, comprising:
    (a) a seal surface; and,
    (b) an integrated substrate subassembly, including:
        (i) a backplate;
        (ii) an impingement plate mounted in a spaced relationship, over most of its surface area, over the backplate; and,
        (iii) a manifold, mounted over the impingement plate, having a single inlet; and,
        (iv) means for preventing leakage the manifold single inlet and the turbine case structure.

10. The outer air seal assembly according to claim 9, wherein the means for preventing leakage comprise a compressible seal.

11. The outer air seal assembly according to claim 10, wherein the compressible seal is a metal "C" section seal.

12. The outer air seal assembly according to claim 9, wherein the manifold is brazed or welded to the impingement plate.

13. The outer air seal assembly according to claim 12, wherein the impingement plate is brazed or welded to the backplate.

14. The outer air seal assembly according to claim 9, a chamber being defined between the backplate and the impingement plate, further comprising exhaust means from the chamber.

15. The outer air seal assembly according to claim 14, wherein the exhaust means include a plurality of purge holes along an edge of the backplate in contact with the impingement plate.

* * * * *